(12) United States Patent
Onuki

(10) Patent No.: US 11,870,365 B2
(45) Date of Patent: Jan. 9, 2024

(54) AC GENERATION CIRCUIT AND AC GENERATION DEVICE

(71) Applicant: HONDA MOTOR CO., LTD., Tokyo (JP)

(72) Inventor: Yasumichi Onuki, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 17/875,483

(22) Filed: Jul. 28, 2022

(65) Prior Publication Data

US 2023/0045910 A1 Feb. 16, 2023

(30) Foreign Application Priority Data

Aug. 10, 2021 (JP) .................................. 2021-130824

(51) Int. Cl.
H02M 7/44 (2006.01)

(52) U.S. Cl.
CPC ........... H02M 7/44 (2013.01); *H02J 2207/20* (2020.01)

(58) Field of Classification Search
CPC .............................. H02M 7/44; H02J 2207/20
See application file for complete search history.

(56) References Cited

U.S. PATENT DOCUMENTS

| 2012/0021263 | A1* | 1/2012 | Nishi | H01M 10/657 |
| | | | | 429/62 |
| 2012/0112695 | A1 | 5/2012 | Nishi et al. | |
| 2016/0276935 | A1 | 9/2016 | Arai | |
| 2020/0067302 | A1* | 2/2020 | Tsuchiya | H02H 3/202 |
| 2020/0247340 | A1* | 8/2020 | Furukawa | B60R 21/0132 |

FOREIGN PATENT DOCUMENTS

| JP | 11-025839 | 1/1999 |
| JP | 2011-018533 | 1/2011 |
| JP | 2016-177931 | 10/2016 |
| JP | 2018-157674 | 10/2018 |
| WO | 2011/004464 | 1/2011 |

OTHER PUBLICATIONS

Japanese Office Action for Japanese Patent Application No. 2021-130824 dated Jun. 6, 2023.

* cited by examiner

*Primary Examiner* — Jared Fureman
*Assistant Examiner* — Duc M Pham
(74) *Attorney, Agent, or Firm* — Amin, Turocy & Watson, LLP

(57) ABSTRACT

An AC generation circuit is attached to a secondary battery, and includes a circuit configured to generate an alternating current at both ends of the secondary battery, a current limiting element connected between a positive electrode side of the circuit and a positive element of the secondary battery and/or between a negative electrode side of the circuit and a negative electrode of the secondary battery, and a capacitor connected in parallel to the current limiting element.

3 Claims, 4 Drawing Sheets

AC GENERATION CIRCUIT AND AC GENERATION DEVICE

CROSS-REFERENCE TO RELATED APPLICATION

Priority is claimed on Japanese Patent Application No. 2021-130824, filed Aug. 10, 2021, the content of which is incorporated herein by reference.

BACKGROUND OF THE INVENTION

Field of the Invention

The present invention relates to an AC generation circuit and an AC generation device.

Description of Related Art

Electric vehicles that travel by electric power stored in secondary batteries are widely spread to reduce adverse effects on the global environment (for example, to reduce NOx and SOx, and to reduce $CO_2$). It is known that charging and discharging characteristics of a secondary battery deteriorate if a temperature of the secondary battery drops below an appropriate level. In this regard, a secondary battery heating device is disclosed, which is capable of efficiently raising a temperature of a secondary battery by effectively heating the secondary battery from the inside to efficiently raise the temperature when the temperature of the secondary battery is low (for example, PCT International Publication No. WO2011/004464).

A method of providing a current limiting element at a place connecting a power storage body and a circuit to prevent a short-circuit current from being generated in a design circuit when a device that raises the temperature of the secondary battery as described above is provided is known. In this regard, a current suppression circuit breaker unit that includes a current limiting element to limit the short-circuit current is disclosed (for example, Japanese Unexamined Patent Application, First Publication No. H11-25839).

SUMMARY OF THE INVENTION

Since a rating of the current limiting element is set according to a magnitude of a passing current, when the passing current of the AC generation circuit becomes large, it is necessary to use a current limiting element having a high rating. However, if the rating of the current limiting element becomes large, it takes a long time for the current limiting element to start operating, and a current in the meantime may cause damage to a circuit or the like.

Aspects of the present invention have been made in consideration of such circumstances, and an object thereof is to provide an AC generation circuit and an AC generation device that can suppress an increase in size and price of a current limiting element to be used and improve protection performance of peripheral devices by reducing a load on the current limiting element and decreasing the rating of the current limiting element.

In order to solve the problems described above, the present invention has adopted the following aspects.

(1): An AC generation circuit according to one aspect of the present invention is an AC generation circuit attached to a secondary battery, and includes a circuit configured to generate alternating current at both ends of the secondary battery, a current limiting element connected between a positive electrode side of the circuit and a positive element of the secondary battery and/or between a negative electrode side of the circuit and a negative electrode of the secondary battery, and a capacitor connected in parallel to the current limiting element.

(2): In the aspect of (1) described above, the circuit may generate the alternating current using electric power stored by the secondary battery without an external power source.

(3): In the aspect of (1) or (2) described above, the circuit may include two or more in-circuit capacitors and generate the alternating current by switching a connection relationship of the two or more in-circuit capacitors in series or in parallel with respect to the secondary battery.

(4): An AC generation device according to another aspect of the present invention includes an AC generation circuit according to any one of (1) to (3) described above, and a control unit configured to generate an alternating current in the circuit by controlling a switch included in the circuit.

According to the aspects of (1) to (4) described above, it is possible to suppress an increase in size and price of a current limiting element to be used and to improve protection performance of peripheral devices by reducing a load on the current limiting element and decreasing a rating of the current limiting element.

According to the aspect of (2) or (3) described above, it is possible to decrease an entire system in size and weight and improve energy efficiency, in addition to suppressing an increase in size and price of the current limiting element and ensuring protection performance of peripheral devices while an external power supply is not required.

DETAILED DESCRIPTION OF THE INVENTION

Hereinafter, embodiments of an AC generation circuit and an AC generation device of the present invention will be described with reference to the drawings. The AC generation circuit and the AC generation device are attached to a secondary battery and raise a temperature of the secondary battery when necessary.

First Embodiment

Figure 1:
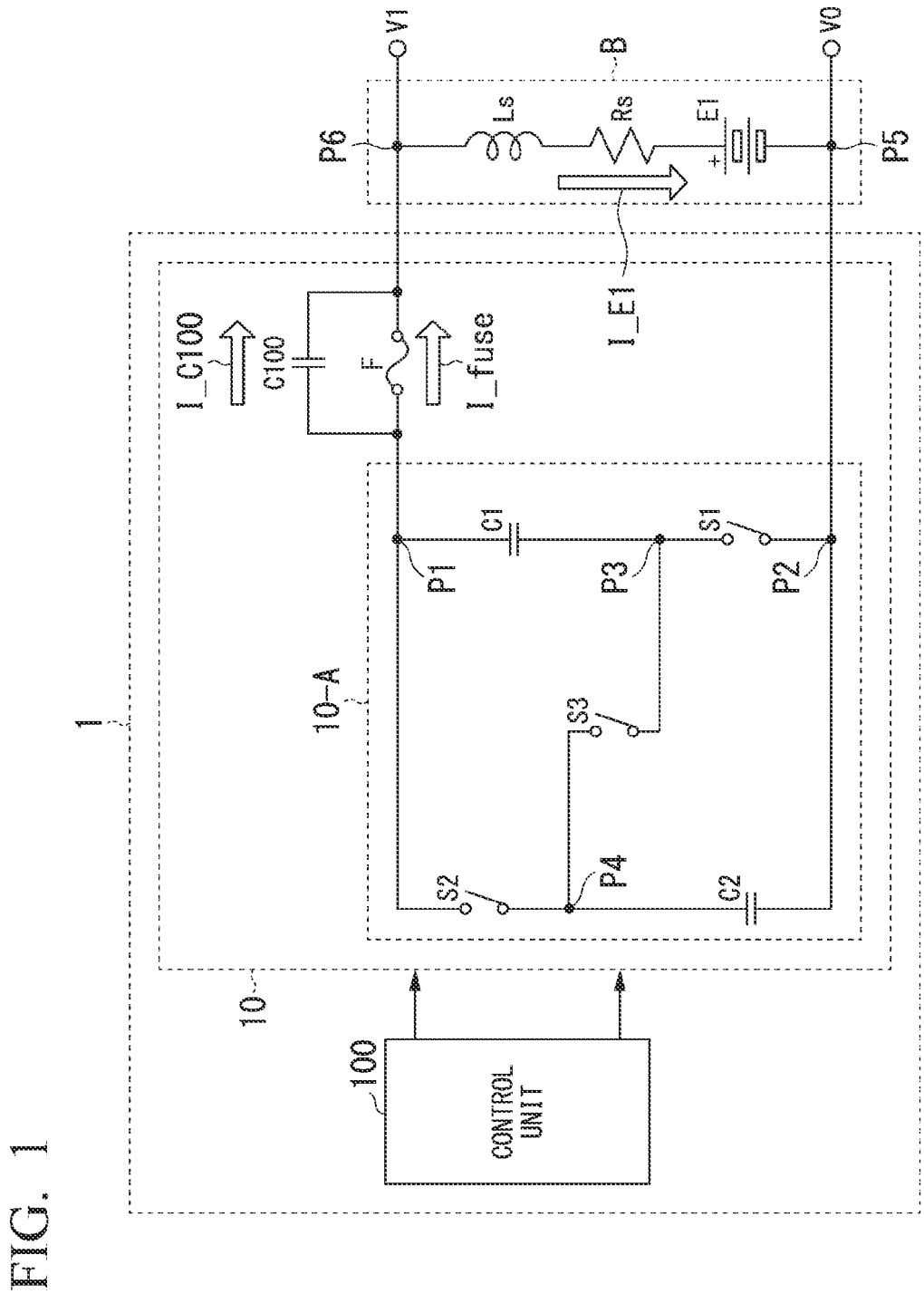
FIG. 1 is a diagram which shows an example of a configuration of an AC generation device 1 and an AC generation circuit 10 of a first embodiment.

FIG. 1 is a diagram which shows an example of a configuration of an AC generation device 1 and an AC generation circuit 10 of a first embodiment. In the present embodiment, the AC generation device 1 includes an AC generation circuit 10 and a control unit 100. The AC generation circuit 10 includes a circuit 10-A for generating an alternating current, a capacitor C100, and a fuse F. A positive electrode side of the circuit 10-A is connected to a positive electrode of a secondary battery B via the fuse F and a negative electrode side of the circuit 10-A is connected to a negative electrode of the secondary battery B. The capacitor C100 is connected to the fuse F in parallel with it.

In FIG. 1, characteristics of the secondary battery B are virtually represented as a power storage unit E, a resistance $R_S$, and an inductance $L_S$. The secondary battery B is, for example, a battery that can be repeatedly charged and discharged, such as a lithium-ion battery. The secondary battery B may be simply one battery, or may include a plurality of battery blocks and may be an electric connection of these battery blocks in series or in parallel with each other. Electric power supplied by the secondary battery B may be supplied to a load via a DC-AC converter (not shown), a DC-DC converter, or the like.

A contact point P1 on the positive electrode side of the circuit 10-A is connected to a first end of the fuse F. A contact point P2 on the negative electrode side of the circuit 10-A is connected to a contact point P5 which is the negative electrode of the secondary battery B. Capacitors C1 and C2 and switches S1 to S3 for generating an alternating current are provided between the contact point P1 and the contact point P2. This configuration corresponds to the circuit 10-A.

In the circuit 10-A, a first path in which a capacitor C1 and a switch S1 are connected in series and a second path in which a switch S2 and a capacitor C2 are connected in series are present in parallel between the contact point P1 and the contact point P2. A contact point P3 between the capacitor C1 and the switch S1 and a contact point P4 between the switch S2 and the capacitor C2 are connected by a third path. A switch S3 is provided in the third path.

A second end of the fuse F is connected to a contact point P6. When a current flowing through the fuse F becomes larger than a fixed current, the fuse F is fused to cut off the current. The fuse F is an example of a "current limiting element." For example, other current limiting elements such as a positive temperature coefficient (PTC) thermistor may also be used.

The capacitor C100 is provided in parallel with the fuse F. That is, both ends of the capacitor C100 are connected to each of the contact point P1 and the contact point P6. The capacitor C100 selectively allows AC components flowing between the contact point P1 and the contact point P6 to pass through it, and suppresses passage of a DC component.

The control unit 100 is realized by, for example, a central processing unit (CPU), a large scale integration (LSI), an application specific integrated circuit (ASIC), an integrated circuit (IC), or the like. The control unit 100 generates alternating current in the circuit 10-A by controlling, for example, ON or OFF of each of the switches S1 to S3 included in the circuit 10-A. In the present embodiment, the capacitors C1 and C2 are examples of in-circuit capacitors, and their capacities are set to be the same. A capacity of the capacitor C100 may be the same as or different from the capacities of the in-circuit capacitors.

In the circuit 10-A, the control unit 100 switches the capacitor C1 and the capacitor C2 in series or in parallel with respect to the secondary battery B by controlling, for example, the switches S1, S2, and S3. The control unit 100 turns on the switch S1 and the switch S2 and turns off the switch S3 to make the capacitor C1 and the capacitor C2 parallel with respect to the secondary battery B, or turns off the switch S1 and the switch S2 and turns on the switch S3 to make the capacitor C1 and the capacitor C2 in series with respect to the secondary battery B.

When the capacitor C1 and the capacitor C2 are in parallel with respect to the secondary battery B, respective voltages of the capacitor C1 and the capacitor C2 approach a voltage of the secondary battery B (the capacitors are charged). On the other hand, when the capacitor C1 and the capacitor C2 are in series with respect to the secondary battery B, the respective voltages of the capacitor C1 and the capacitor C2 approach one half of the voltage of the secondary battery B (the capacitors are discharged). By repeating this, an alternating current is generated between the circuit 10-A and the secondary battery B. The control unit 100 controls the switches S1, S2, and S3 in this manner.

Figure 2:
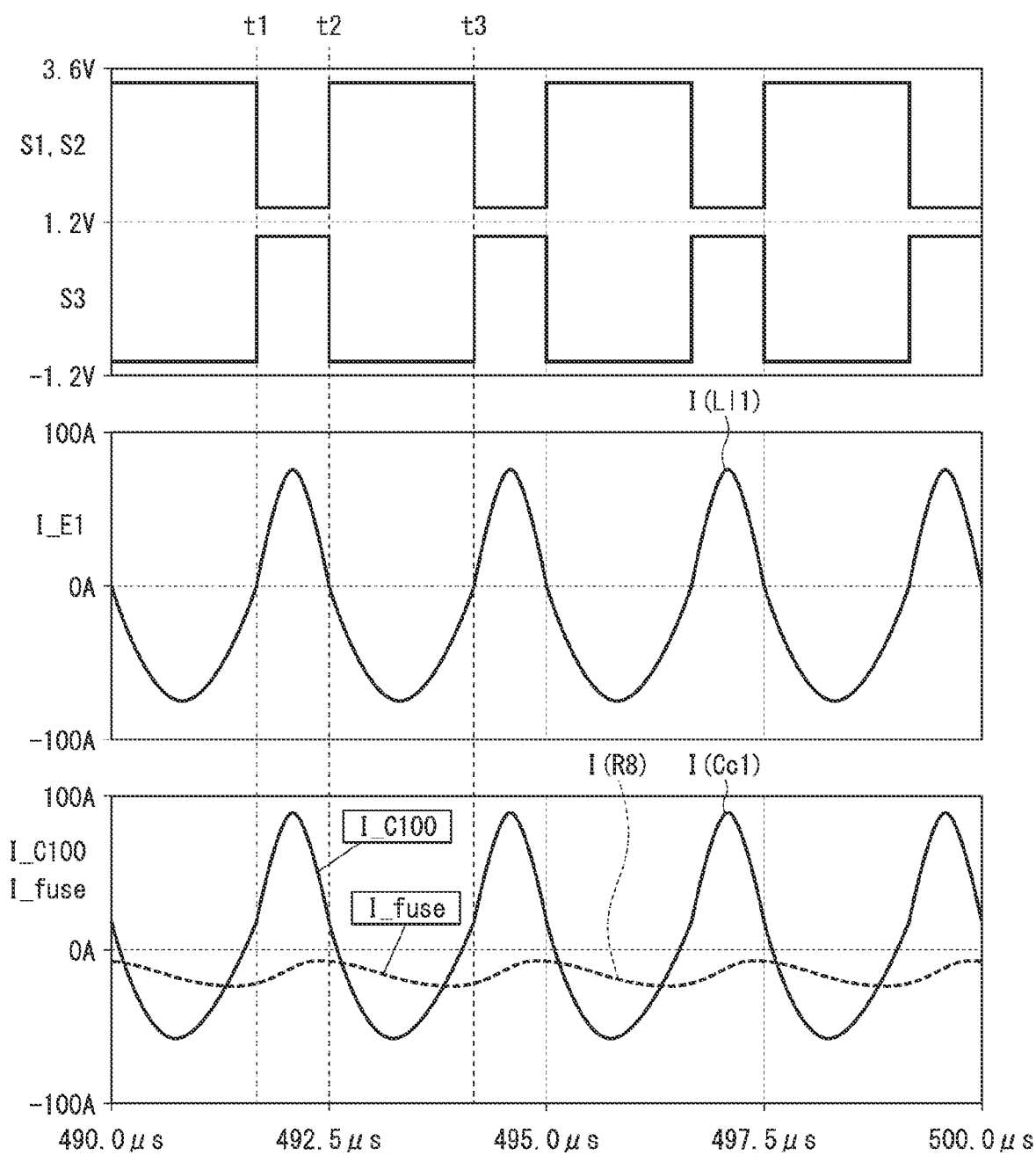
FIG. 2 is a diagram which shows an example of a change in current occurring according to ON or OFF of a switch of a circuit 10-A of the first embodiment.

FIG. 2 is a diagram which shows an example of a change in current generated by turning on or off a switch of the circuit 10-A of the first embodiment. The change shown in FIG. 2 is a result of simulation by the inventor of the present application. As shown in FIG. 2, the capacitor C1 and the capacitor C2 are connected in series with respect to the secondary battery B at a time t1 in the circuit 10-A. Since a sum of voltages of the capacitor C1 and the capacitor C2 is larger than the voltage of the secondary battery B before the time t1, each of the capacitor C1 and the capacitor C2 is discharged and the secondary battery B is charged with the discharged electric power from the time t1 to a time t2. The capacitor C1 and the capacitor C2 are connected in parallel with respect to the secondary battery B at the time t2. Since the sum of the voltages of the capacitor C1 and the capacitor C2 is smaller than the voltage of the secondary battery B before the time t2, each of the capacitor C1 and the capacitor C2 is charged and the secondary battery B is discharged from the time t2 to a time t3. Due to the presence of an inductance $L_S$, a current I_E1 is maintained to flow in a direction from each of the capacitors C1 and C2 to the secondary battery B, so that a change in a waveform of the current I_E1 is slower than a change in a waveform of a voltage V1-V0 (not shown), and the waveform of the current I_E1 is as shown in FIG. 2.

Since the capacitor C100 is provided in parallel with the fuse F, the AC generation device 1 allows most of the AC components to pass through the capacitor C100 side, thereby reducing AC components passing through the fuse F side.

Comparison with Comparative Example

Figure 3:
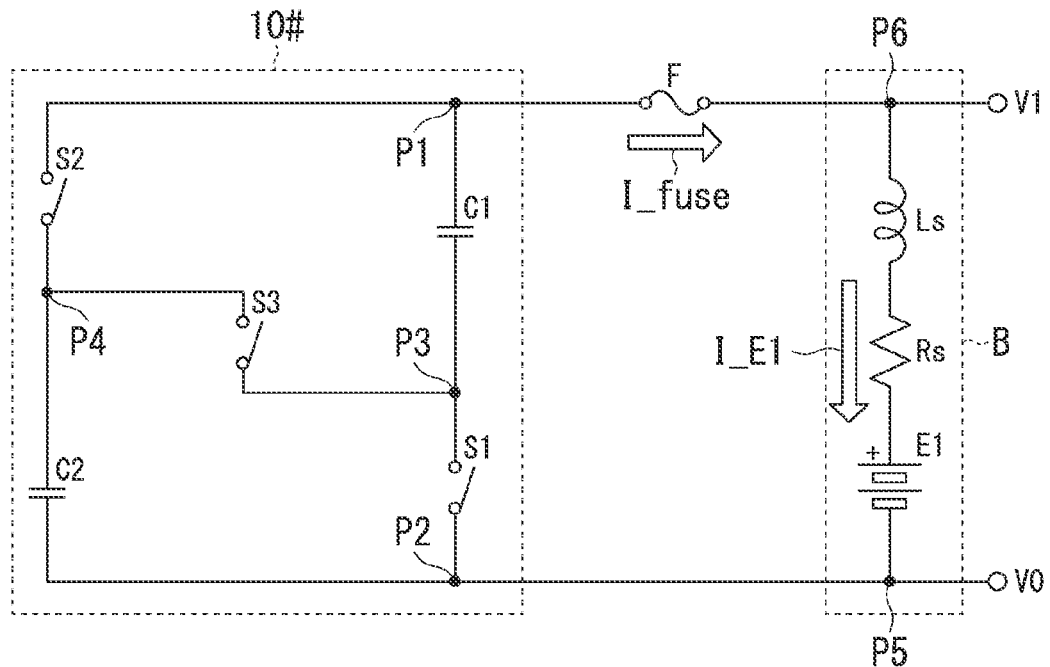
FIG. 3 is a diagram which shows an example of a configuration of an AC generation circuit 10 # of a comparative example of the first embodiment.

Here, a comparison with a comparative example of the first embodiment will be described. FIG. 3 is a diagram which shows an example of a configuration of an AC generation circuit 10 # of the comparative example of the first embodiment. In FIG. 3, for convenience, the same reference numerals are given to components having the same functions as in the first embodiment. In the AC generation circuit 10 # of the comparative example, as shown in FIG. 3, the capacitor C100 is not provided, and only the fuse F1 is provided between the contact point P1 and the contact point P6.

Figure 4:
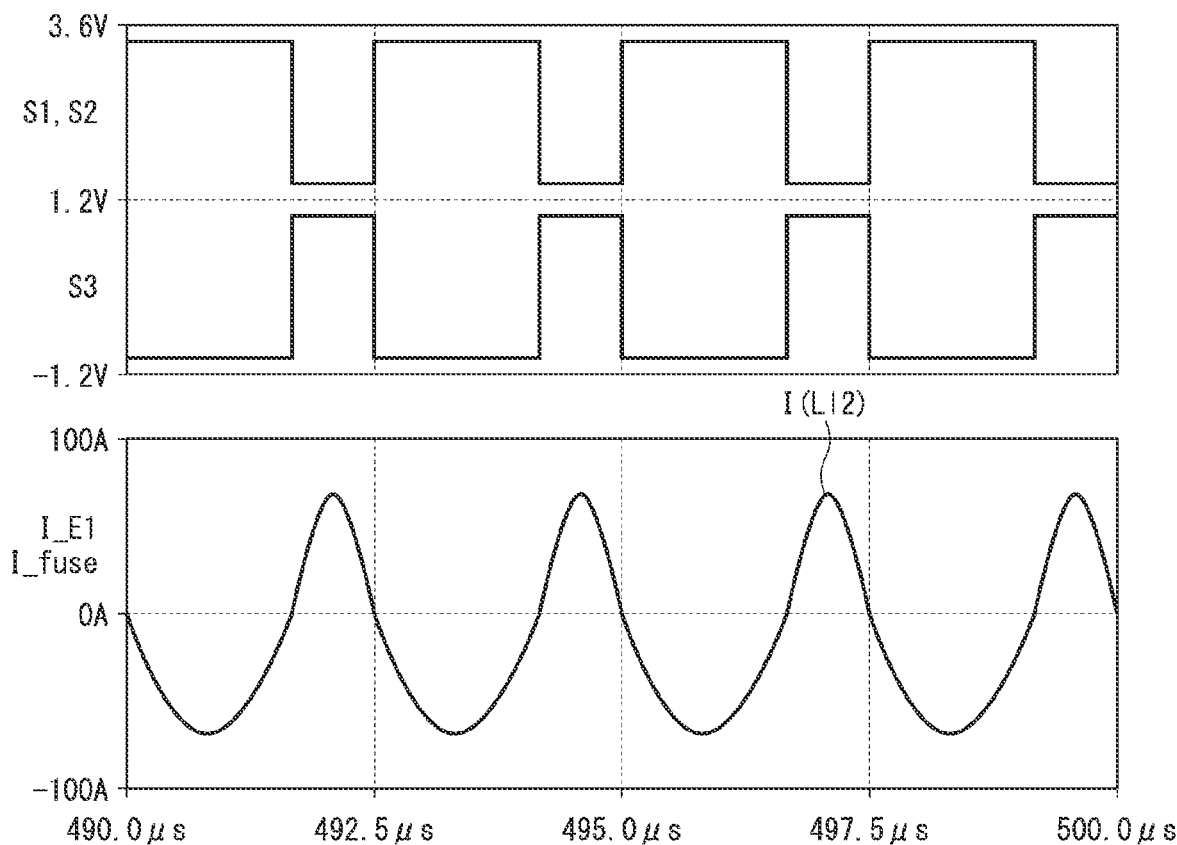
FIG. 4 is a diagram which shows an example of a change in current occurring according to ON or OFF of a switch of the AC generation circuit 10 # of the comparative example of the first embodiment.

FIG. 4 is a diagram which shows an example of a change in current generated by turning on or off a switch of the AC generation circuit 10 # in the comparative example of the first embodiment. The change shown in FIG. 4 is also the result of simulation by the inventor of the present application. As shown in FIG. 4, a current I_fuse flowing through the fuse F is the same as the current LE1 flowing through the secondary battery B, but while it flows exclusively through the capacitor C100 in the embodiment, it flows through the fuse F in the comparative example. As a result, as compared with the embodiment, a current flowing through the fuse F becomes larger when the AC generation circuit 10 # is operated. Then, it is necessary to use the fuse F having a higher rating than that in the embodiment. When the rating of the fuse F increases, time until the fuse F starts to operate is lengthened, and damage can be caused to a circuit or the like when a large current flows in the meantime.

On the other hand, according to the AC generation circuit 10 of the first embodiment, since the capacitor C100 is provided, when a temperature of the secondary battery B is raised, it is possible to use the fuse F having a lower rating by reducing the AC components passing through the fuse F side. When the fuse F with a low rating is used, the time until the fuse F starts to operate is shortened and the probability of a current damaging a circuit or the like can be reduced. By decreasing the rating of the fuse F, the increase in size and price of the fuse F is suppressed. Furthermore, since the capacitor C100 is provided, protection performance of peripheral devices can be ensured. Because the AC generation circuit 10 of the first embodiment can generate alternating current based on electric charges stored in the secondary battery B, in addition to exhibiting the effect described above, an external power source is not required. As a result, the entire system can be made smaller and lighter, and energy efficiency can be improved.

According to the first embodiment described above, it is possible to suppress an increase in size and price of a current limiting element (for example, a fuse) to be used and to improve the protection performance of peripheral devices by reducing a load on the current limiting element and decreasing the rating of the current limiting element.

Second Embodiment

In the first embodiment, it is exemplified that there is a set of a fuse and a capacitor provided in parallel between the positive electrode side of the circuit 10-A and the positive electrode of the secondary battery B (or between the negative electrode side of the circuit 10-A and the negative electrode of the secondary battery B). In the second embodiment, an example in which there is a set of a fuse and a capacitor provided in parallel both between the positive electrode side of the circuit 10-A and the positive electrode of the secondary battery B, and between the negative electrode side of the circuit 10-A and the negative electrode of the secondary battery B will be described.

Figure 5:
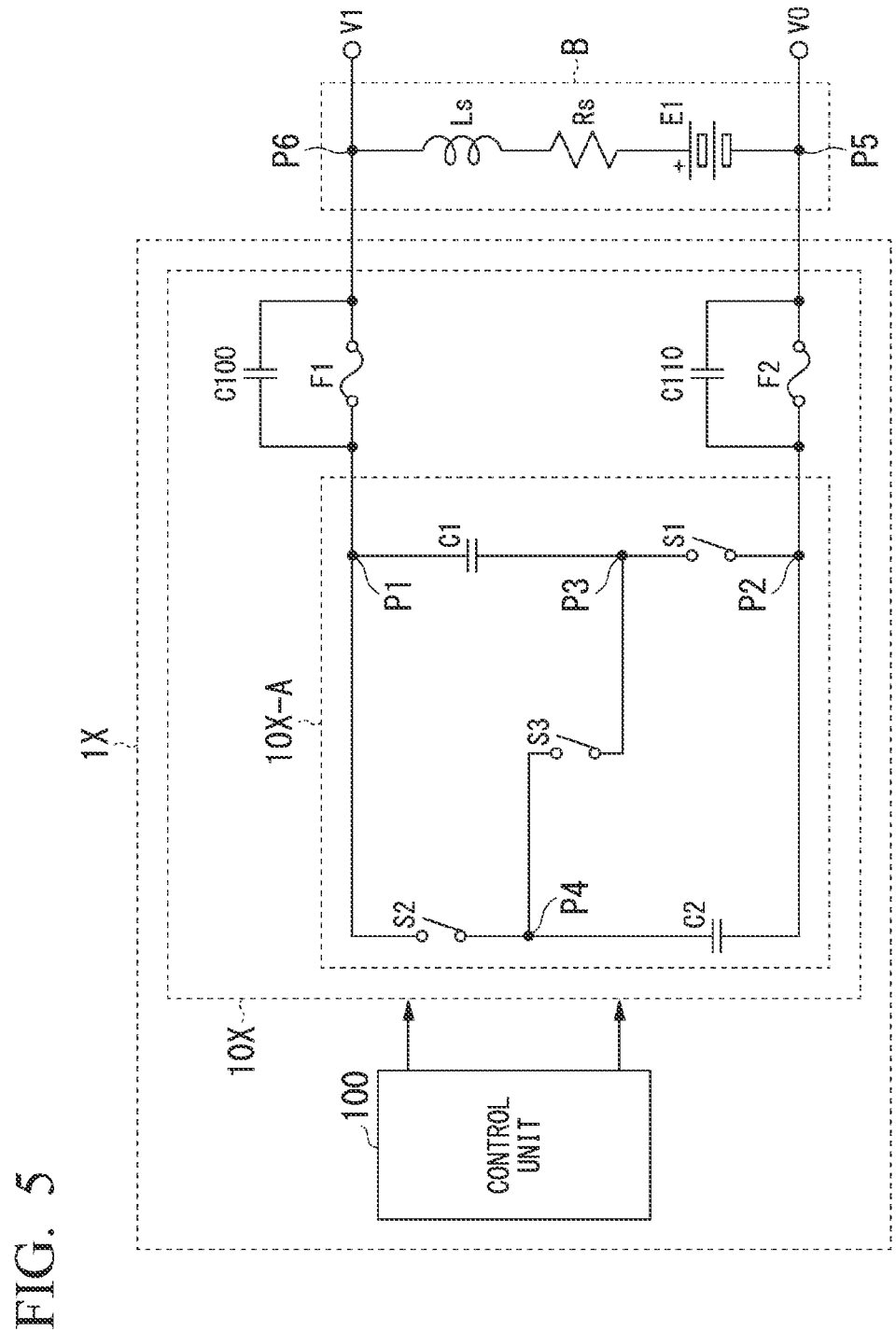
FIG. 5 is a diagram which shows an example of a configuration of an AC generation device 1X and an AC generation circuit 10X of a second embodiment.

FIG. 5 is a diagram which shows an example of a configuration of an AC generation device 1X and an AC generation circuit 10X of the second embodiment. In FIG. 5, for convenience, the same reference numerals are given to components having the same functions as in the first embodiment. In the second embodiment, as shown in FIG. 5, a positive electrode side of a circuit 10X-A is connected to the positive electrode of the secondary battery B via the fuse F1, and a negative electrode side of the circuit 10X-A is connected to the negative electrode of the secondary battery B via the fuse F2. The capacitor C100 is connected to a fuse F1 in parallel with it. A capacitor C110 is connected to a fuse F2 in parallel with it.

A contact point P1 on the positive electrode side of the circuit 10X-A is connected to a first end of the fuse F1. A contact point P2 of the negative electrode side of the circuit 10X-A is connected to a first end of the fuse F2. A second end of the fuse F1 is connected to a contact point P6 and a second end of the fuse F2 is connected to a contact point P5.

The capacitor C100 is provided in parallel with the fuse F1. That is, both ends of the capacitor C100 are connected to each of the contact point P1 and the contact point P6. The capacitor C100 selectively allows an AC component flowing between the contact point P1 and the contact point P6 to pass through it, and suppresses the passage of a DC component. The capacitor C110 is provided in parallel with the fuse F2. That is, both ends of the capacitor C110 are connected to each of a contact point P2 and a contact point P5. The capacitor C110 selectively allows an AC component flowing between the contact point P2 and the contact point P5 to pass through it, and suppresses the passage of a DC component. Since other configurations of the AC generation circuit 10X are the same as those in the first embodiment, detailed description thereof will be omitted.

In the second embodiment, since the capacitor C100 is provided in parallel with the fuse F1 and the capacitor C110 is provided in parallel with the fuse F2, the AC generation device 1X allows most of the AC components to pass to the capacitor C100 side and the capacitor C110 side, thereby reducing the AC components passing through the fuse F1 side and the fuse F2 side.

According to the AC generation circuit 10 of the second embodiment, since the capacitor C100 and the capacitor C110 are provided, when the temperature of the secondary battery B is raised, it reduces the AC components passing through the fuse F1 side and the fuse F2 side, thereby using the fuse F1 and the fuse F2 having low ratings. When the fuse F1 and the fuse F2 having low ratings are used, the time until the fuse F1 and the fuse F2 start to operate is shortened, and the probability of a current damaging a circuit or the like can be reduced. Then, it is possible to suppress an increase in size and price of the fuse F1 and the fuse F2 by decreasing the ratings of the fuse F1 and the fuse F2. Furthermore, since the capacitor C100 and the capacitor C110 are provided, it is possible to ensure the protection performance of peripheral devices. Since an alternating current can be generated based on electric charges stored in the secondary battery B, an external power supply is not required.

According to the AC generation circuit 10 of the second embodiment described above, since two fuses are provided on each of the positive electrode side and the negative electrode side of the circuit 10X-A, it can improve the protection performance of peripheral devices, in addition to exhibiting the effect of the first embodiment.

Although modes for implementing the present invention have been described above using the embodiments, the present invention is not limited to these embodiments, and various modifications and substitutions can be made within a range not departing from the gist of the present invention.

What is claimed is:
1. An AC generation circuit attached to a secondary battery, comprising:
   a circuit configured to generate an alternating current at both ends of the secondary battery;
   a current limiting element connected between a positive electrode side of the circuit and a positive element of the secondary battery and/or between a negative electrode side of the circuit and a negative electrode of the secondary battery; and
   a capacitor connected in parallel to the current limiting element,
   wherein the circuit includes two or more in-circuit capacitors and generates the alternating current by switching a connection relationship of the two or more in-circuit capacitors in series or in parallel with respect to the secondary battery.

2. The AC generation circuit according to claim 1, wherein the circuit generates the alternating current using electric power stored by the secondary battery without an external power source.

3. An AC generation device comprising:
the AC generation circuit according to claim 1; and
a control unit configured to generate an alternating current in the circuit by controlling a switch included in the circuit.

\* \* \* \* \*